United States Patent [19]
Sekine et al.

[11] Patent Number: 6,112,027
[45] Date of Patent: *Aug. 29, 2000

[54] SHAKEPROOF CAMERA

[75] Inventors: Masayoshi Sekine, Tokyo; Toshiaki Kondo, Fujisawa, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/312,928

[22] Filed: Sep. 30, 1994

Related U.S. Application Data

[63] Continuation of application No. 08/006,798, Jan. 21, 1993, abandoned.

[30] Foreign Application Priority Data

Jan. 23, 1992 [JP] Japan ..................................... 4-010183

[51] Int. Cl.$^7$ .................................................. G03B 17/00
[52] U.S. Cl. ............................................................. 396/52
[58] Field of Search ............................. 354/70, 202, 400, 354/402, 432; 358/222; 396/52, 53, 54, 55; 348/208

[56] References Cited

U.S. PATENT DOCUMENTS

| | | | |
|---|---|---|---|
| 3,212,420 | 10/1965 | Juan De La Cierva | 95/12.5 |
| 4,965,619 | 10/1990 | Shikaumi et al. | 354/410 |
| 5,101,230 | 3/1992 | Shikaumi et al. | 354/430 |
| 5,107,293 | 4/1992 | Sekine et al. | 354/430 |
| 5,155,520 | 10/1992 | Nagasaki | 354/70 X |
| 5,161,026 | 11/1992 | Mabuchi et al. | 358/225 |
| 5,166,722 | 11/1992 | Kusaka | 354/430 X |
| 5,237,365 | 8/1993 | Miyazawa | 354/430 X |
| 5,245,378 | 9/1993 | Wahisu | 354/430 X |
| 5,485,208 | 1/1996 | Mabuchi et al. | 348/335 |

FOREIGN PATENT DOCUMENTS

| | | |
|---|---|---|
| 0424678 | 2/1991 | European Pat. Off. . |
| 61-269572 | 11/1986 | Japan . |
| 63-57670 | 3/1988 | Japan . |
| 63-92695 | 4/1988 | Japan . |
| 63-226016 | 9/1988 | Japan . |
| 1-180462 | 7/1989 | Japan . |
| 1-296104 | 11/1989 | Japan . |
| 4-86731 | 3/1992 | Japan . |

OTHER PUBLICATIONS

Patent Abstracts of Japan, vol. 16, No. 309, Jul. 8, 1992.

*Primary Examiner*—Safet Metjahic
*Assistant Examiner*—Christopher Mahoney
*Attorney, Agent, or Firm*—Fitzpatrick, Cella, Harper & Scinto

[57] ABSTRACT

A shakeproof camera includes a focus detection circuit for detecting a focus state from an image pickup signal output from an image pickup element, a luminance detection circuit for detecting a luminance from the image pickup signal, a shake detection circuit for detecting a shake vector of an image from the image pickup signal, and a control circuit for fetching outputs from the above detection circuits and performing focus control, exposure control, and shakeproof control. The detection circuits outputs the detection results during a vertical blanking period. The control circuit preferentially performs an arithmetic operation for shakeproof control on the basis of an output from the shake detection circuit and then performs other control operations.

28 Claims, 4 Drawing Sheets

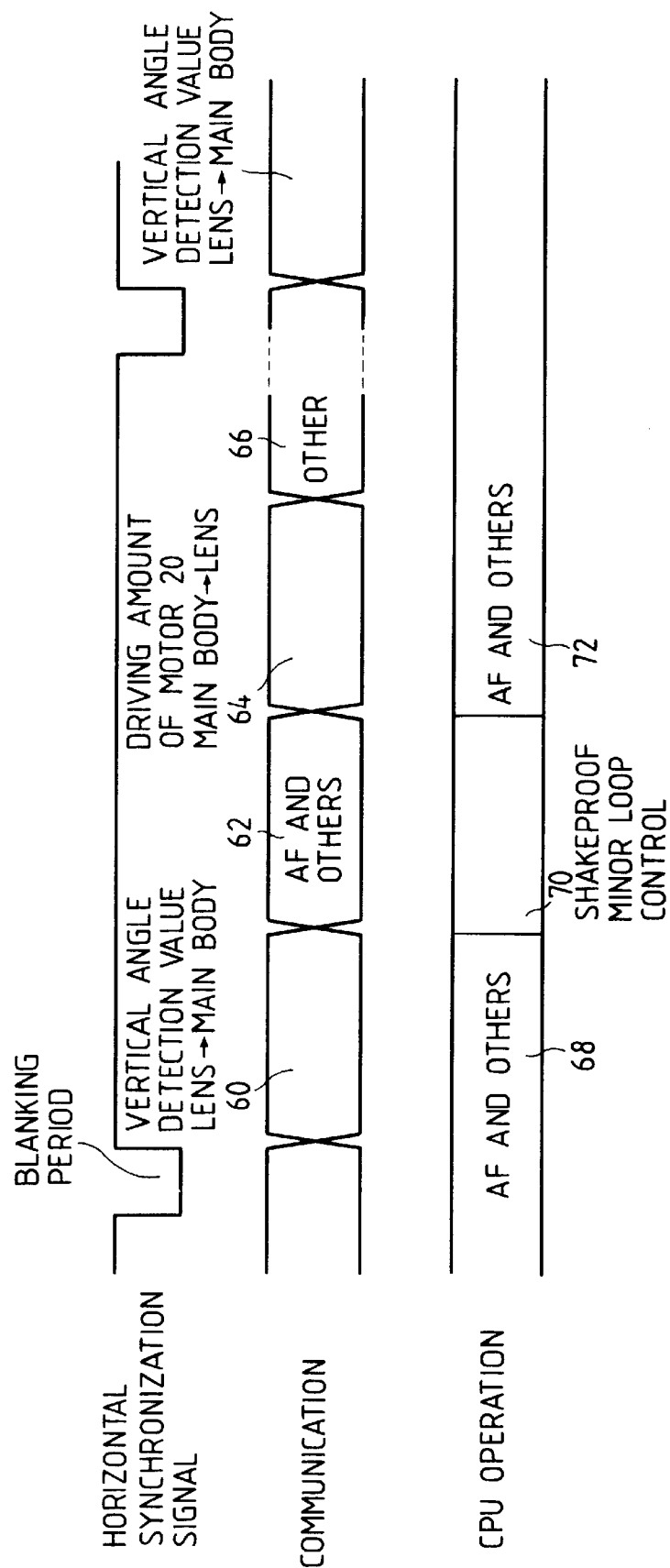

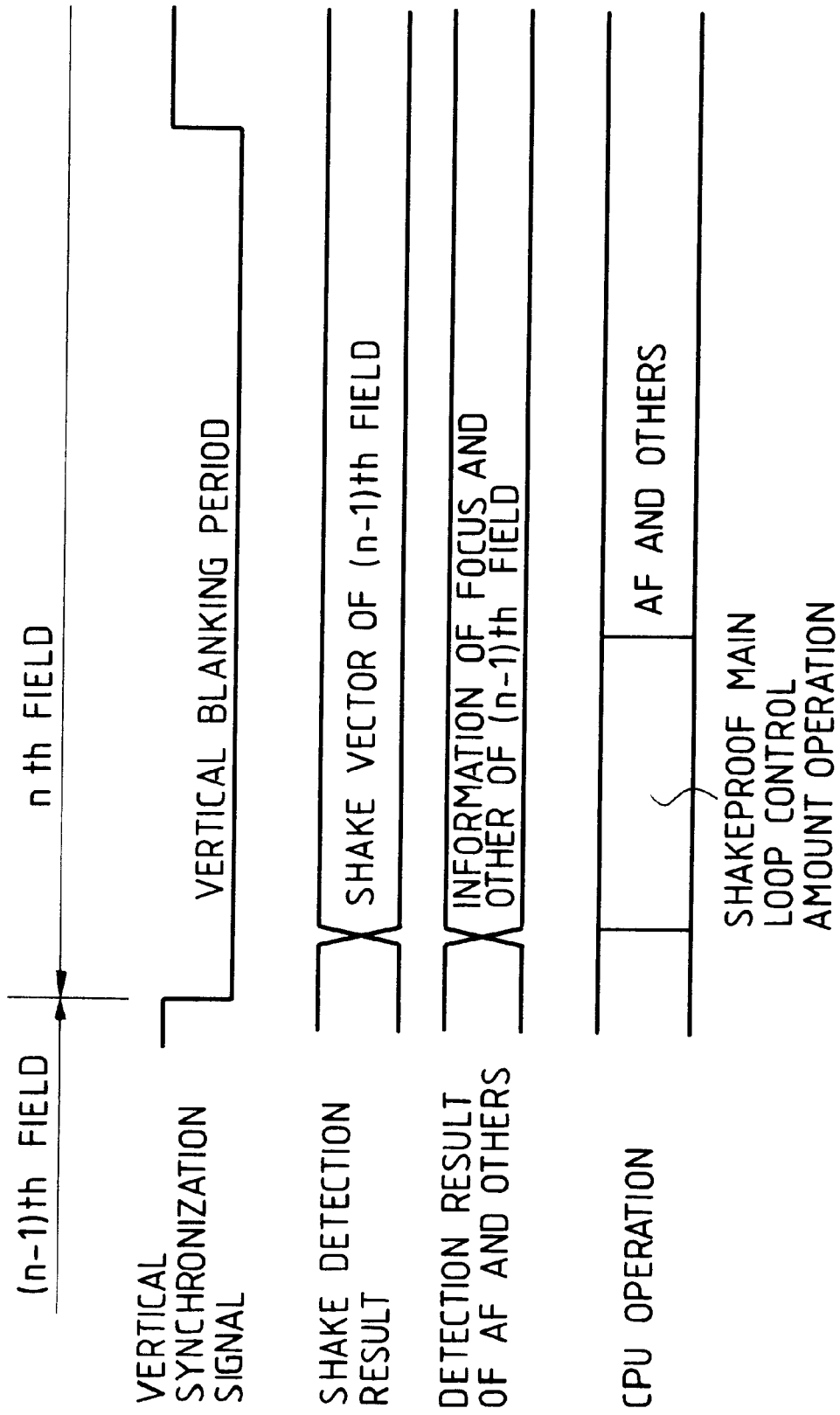

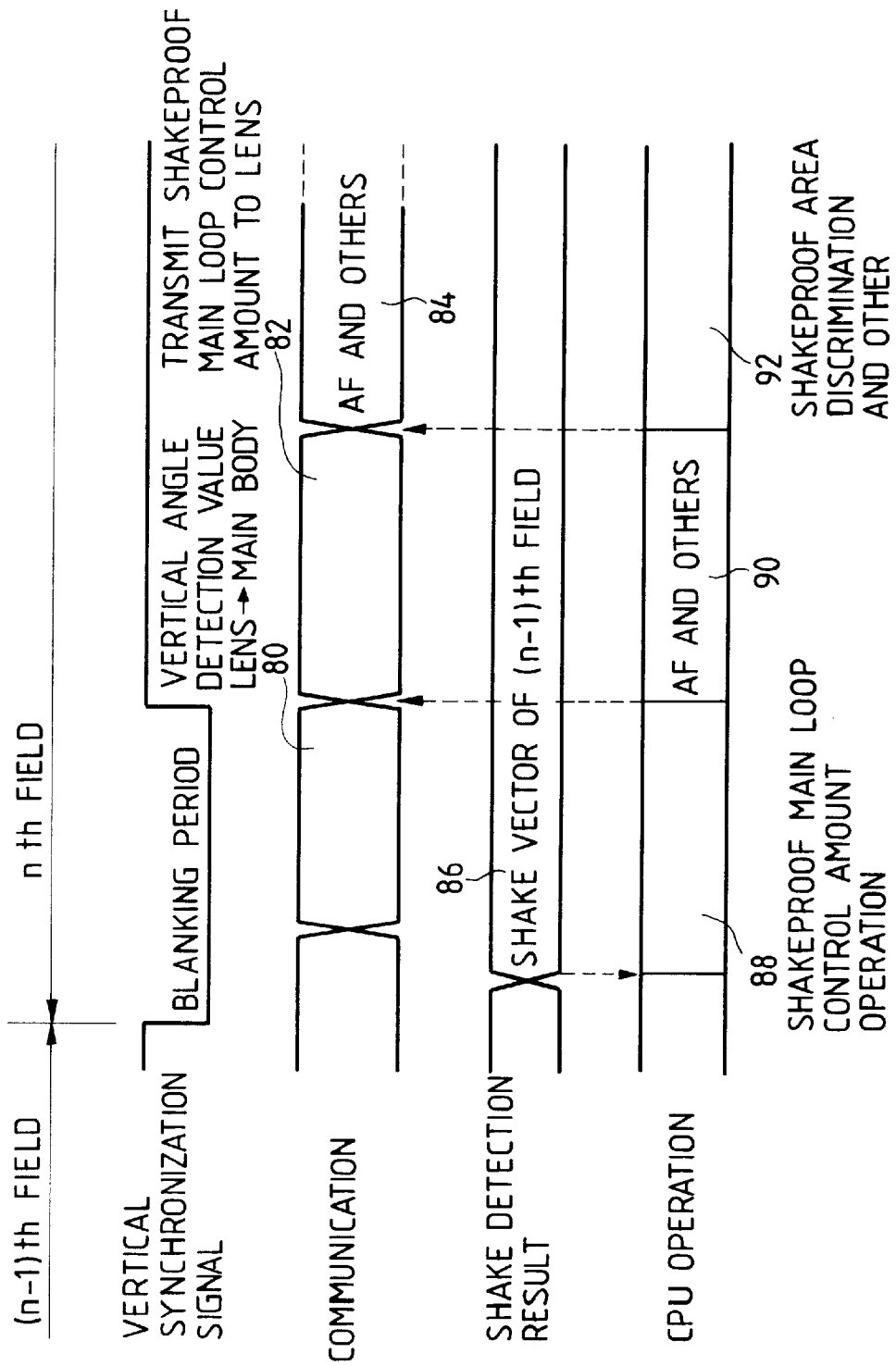

SHAKEPROOF CAMERA

This application is a continuation of application Ser. No. 08/006,798, filed Jan. 21, 1993, now abandoned.

BACKGROUND OF THE INVENTION

1. Field of the Invention

The present invention relates to a shakeproof camera.

2. Related Background Art

Handshake in conventional cameras is the main causes for degradation of the photographed images. Various types of shakeproof cameras having shakeproof countermeasures have been proposed.

Conventional shakeproof cameras for eliminating influences of external vibrations are classified into a bulky arrangement in which a camera is mounted on a shakeproof table and a relatively compact arrangement in which a variable vertical angle prism is arranged in front of a photographic lens, and a variation in a photographic optical axis is canceled by shifting the photographic optical axis in accordance with a detected shake. The former arrangement is suitable for photography with a camera on a helicopter, and the latter arrangement is suitable for photography with a camera manually carried by a photographer. Examples of the shake detection means are a detecting means using image processing or an acceleration sensor (e.g., Japanese Laid-Open Patent Application Nos. 61-269572, 63-57670, 63-92695, 63-226016, 1-180462, and 1-296104, and U.S. Pat. No. 4,965,619).

In video cameras, exposure control, focus control, color balance control, registration adjustment, gain control (AGC) and the like must be sequentially performed at appropriate timings in addition to shakeproof control. These control operations are generally performed by one microcomputer (to be referred to as a CPU hereinafter).

In a video camera having interchangeable photographic lenses, actuators or motors for respectively driving a focusing lens of a photographic lens, a zoom lens, a stop, and a variable vertical angle prism, and drive circuits for the actuators or motors are incorporated in a lens barrel and are connected to a camera main body through connection terminals arranged on a mount portion. The respective drive circuits may be independently controlled by the CPU in the main body. However, when the number of drive circuits on the lens side is large, the CPU in the camera main body is connected to the circuits or CPU in the lens barrel through a communication line, and control is performed by data communication therebetween.

The respective control operations described above have different required response speeds, respectively. For example, a frequency response speed of about 1 Hz to 10 Hz (i.e., 0.1 sec. or less) is required in shakeproof control. However, a response speed of about 0.5 sec. to 2 sec. is required between the infinity and the nearest distance in focus control. A response speed of about one sec. is required in exposure control for driving the stop. Within the limits of the arithmetic and communication capacities of the CPU, the arithmetic order and its cycle must be appropriately set to effectively perform these control operations.

For example, when a cycle of detection, arithmetic operations, and communication is prolonged (i.e., when the sampling frequency is decreased), the response speed is decreased. If only the arithmetic operation and the communication are delayed, the response speed is decreased to cause degradation of shakeproof performance. On the other hand, if arithmetic operations and communication for focus control and exposure control are performed at a sampling rate higher than necessary, high-speed elements must be used to constitute the CPU and the communication system. This arrangement is not suitable as an industrial product.

SUMMARY OF THE INVENTION

The present invention has been made to solve the above problems, and has as its first object to provide a video camera capable of maximizing the individual characteristics by effectively controlling a plurality of detection and correction systems.

It is the second object of the present invention to effectively perform shakeproof control and improve the response characteristics in a shakeproof camera having an image shake correcting means.

It is the third object of the present invention to provide a shakeproof camera having a plurality of detection.control systems such as a focus detection system, an exposure control system, and a shake detection system, wherein the shake correction system is preferentially controlled to improve the overall characteristics.

In order to achieve the above objects, according to a preferred embodiment of the present invention, there is disclosed a shakeproof camera comprising a plurality of correcting means including shake correcting means for correcting an image shake, and control means for preferentially executing shake correction control over other control operations.

It is the fourth object of the present invention to provide best shakeproof characteristics maximally using the arithmetic capacity of a control CPU by preferentially executing shakeproof control which requires a higher response speed than those of other control operations such as focus control and exposure control.

It is the fifth object of the present invention to provide a shakeproof camera for optically performing shake correction on the lens side, wherein the shakeproof characteristics can be maximally used.

It is the sixth object of the present invention to provide an interchangeable lens type camera for coupling a lens unit and a camera main body through data communication to perform various control operations, wherein the shakeproof characteristics can be maximally exhibited.

It is the seventh object of the present invention to provide a shakeproof camera capable of obtaining maximum shakeproof characteristics by a limited arithmetic capacity of the control CPU.

The above and other objects, features, and advantages of the present invention will be apparent from the following detailed description in conjunction with the accompanying drawings.

BRIEF DESCRIPTION OF THE DRAWINGS

FIG. 2 is a timing chart of the embodiment shown in FIG. 1;

FIG. 3 is a timing chart of fetching detection results of detection circuits 44, 46, and 48; and FIG. 4 is a timing chart of another embodiment.

DETAILED DESCRIPTION OF THE PREFERRED EMBODIMENTS

Figure 1:
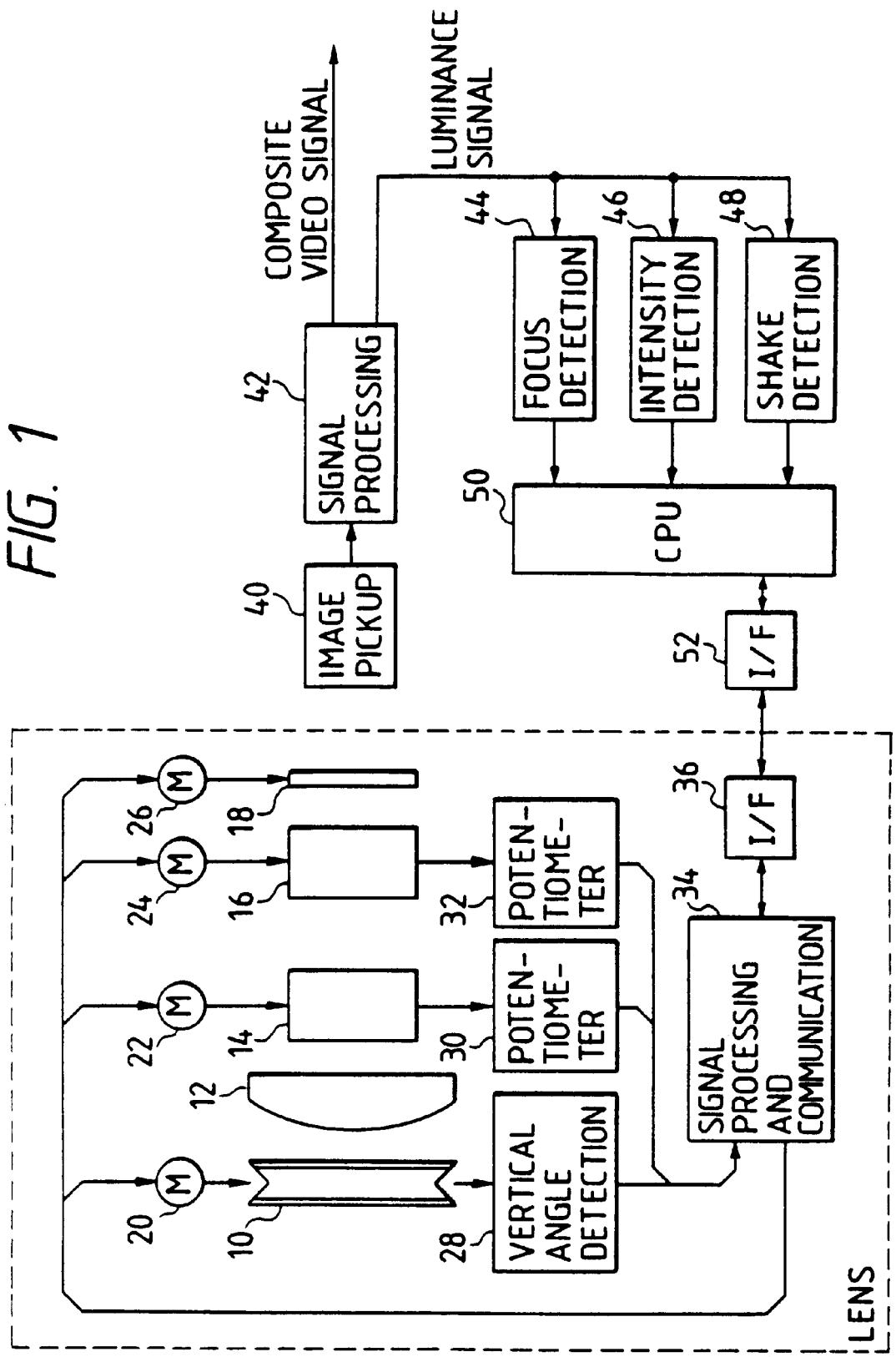
FIG. 1 is a block diagram showing a schematic arrangement of one embodiment according to the present invention.

Preferred embodiments of the present invention will be described with reference to the accompanying drawings.

FIG. 1 is a block diagram showing a schematic arrangement of one embodiment according to the present invention. A variable vertical angle prism 10 serving as a shake correction actuator is arranged such that a liquid having a high refractive index is sealed between two parallel transparent plates. When the angle defined by these two transparent plates is changed, the inclination of the optical axis is changed to cancel movement caused by the shake. A shakeproof camera includes a front element 12 of a photographic lens, a zoom lens 14 for performing variable magnification, a focusing lens 16 for performing focus control, a stop 18 for controlling the exposure, a motor 20 for driving the variable vertical angle prism 10, a motor 22 for driving the zoom lens 14, a motor 24 for driving the focusing lens 16, and a motor 26 for driving the stop 18.

The shakeproof camera also includes a vertical angle detection circuit 28 for detecting the vertical angle of the variable vertical angle prism 10, a potentiometer 30 for detecting the position of the zoom lens, a potentiometer 32 for detecting the position of the focusing lens 16, a signal processing and communication circuit 34 for transmitting detection information from the vertical angle detection circuit 28 and pieces of position information from the potentiometers 30 and 32 to the camera main body and for driving the motors 20, 22, and 24 in accordance with drive control signals from the camera main body, and an interface (I/F) 36 for causing the camera main body to communicate with the signal processing and communication circuit 34.

The elements and circuits 10 to 36 surrounded by the dotted line are incorporated in the lens barrel.

The shakeproof camera further includes an image pickup element 40 such as a CCD for converting into an electrical signal an optical image of an object passing through the variable vertical angle prism 10, the lenses 12, 14, and 16, and the stop 18, and a signal processing circuit 42 for processing the output from the image pickup element 40 in the form of a camera signal and for outputting a composite color video signal and a luminance signal.

A focus detection circuit 44 extracts, e.g., a high-frequency component signal changing in accordance with a focus state from the luminance signal output from the signal processing circuit 42 to detect the focal point. An intensity detection circuit 46 detects the intensity (luminance) of the luminance signal. A shake detection circuit 48 detects the shake contained in the output signal from the image pickup element 40. A CPU 50 receives the detection signals from the detection circuits 44, 46, and 48 and each correction system status signal from the signal processing and communication circuit 34 in the lens barrel and performs predetermined arithmetic operations. An interface (I/F) 52 is arranged in the camera main body to cause the CPU 50 to communicate with the signal processing and communication circuit 34 in the lens barrel.

The basic operation of this embodiment will be described below. A beam from the object to be photographed is incident on the image pickup element 40 through the variable vertical angle prism 10, the lenses 12, 14, and 16, and the stop 18. The image pickup element 40 converts the optical image of the object into an electrical signal. The variable vertical angle prism 10 shifts the incident optical axis in accordance with the vertical angle to laterally shift the image, thereby canceling the movement caused by the shake, as described in U.S. Pat. No. 3,212,420.

The vertical angle of the variable vertical angle prism 10 is detected by the vertical angle detection circuit 28, and the detection output is supplied to the signal processing and communication circuit 34. The lens position signals from the zoom lens 14 and the focusing lens 16 are supplied to the signal processing and communication circuit 34 by the potentiometers 30 and 32, respectively. The outputs from the signal processing and communication circuit 34 are supplied to the CPU 50 through the interfaces 36 and 52 at predetermined timings (to be described later).

The signal processing circuit 42 generates and outputs a composite color video signal and its luminance signal. The focus detection circuit 44, the intensity detection circuit 46, and the shake detection circuit 48 process the luminance signal supplied from the signal processing circuit 42 and detect a focal point, an intensity (luminance), and a shake vector, respectively, in units of field periods. The circuits 44, 46, and 48 output the detection results during a vertical blanking period. The CPU 50 fetches the detection results at timings (to be described later).

The CPU 50 calculates and generates control signals for the focusing lens 16, the stop 18, and the variable vertical angle prism 10 at timings (to be described later) on the basis of the detection results from the detection circuits 44, 46, and 48, the signal processing result in the lens barrel, and information from the signal processing and communication circuit 34. The CPU 50 also generates a control signal for the zoom lens 14 in accordance with an operation of a zoom switch (not shown) and supplies this control signal to the signal processing and communication circuit 34. Upon reception of the control signals from the CPU 50, the signal processing and control circuit 34 drives the motors 20, 22, 24, and 26 in accordance with the corresponding control signals.

In this embodiment, the arithmetic operations for focus control, exposure control, and shakeproof control and information communication are intensively performed by the CPU 50.

As a control loop of the variable vertical angle prism 10, a feedback control loop (to be referred to as a main loop hereinafter) for controlling the prism 10 in accordance with a shake detection signal output from the shake detection circuit 48 every field is superposed on a feedback control loop (to be referred to as a minor loop hereinafter) for keeping the vertical angle of the prism 10 constant in accordance with the detection result from the vertical angle detection circuit 28. The latter feedback control loop is to move the variable vertical angle prism to the central position upon its operation, and the former feedback control is to correct the shake.

When such a multiple control loop is to be constituted by a digital circuit, the sampling frequency of the minor loop must be set higher than that of the main loop in consideration of the response characteristics. A delay time within the loop directly causes degradation of the response characteristics, so delay times within the main and minor loops must be minimized.

In this embodiment, the above problem is solved as follows. FIGS. 2 and 3 are timing charts showing a time distribution between the arithmetic and communication operations of the CPU 50. The CPU 50 performs a minor loop every line of the video signal. That is, a detection value from the vertical angle detection circuit 28 is transferred from the lens to the CPU 50 in the camera main body at a timing 60 in FIG. 2. The CPU 50 performs a shakeproof operation at a timing 70 and transfers the arithmetic operation result (i.e., a drive amount of the motor 20) to the lens at a timing 64. This corresponds to a sampling rate of about 15 kHz for a video signal of the NTSC standards.

The CPU 50 performs arithmetic and communication operations for focus control (AF), exposure control, and others at timings 62, 66, and 72.

The CPU 50 fetches the detection results from the detection circuits 44, 46, and 48 during a vertical blanking period. As shown in FIG. 3, the CPU 50 fetches a shake vector from the shake detection circuit 48 first, and then performs shakeproof main loop control operations. The CPU 50 fetches the detection results from the detection circuits 44 and 46 and performs arithmetic operations for focus control and exposure control. That is, in this embodiment, the shakeproof main loop control is preferentially performed every field. Therefore, the maximum response characteristics of shakeproof control can be expected in the limited arithmetic and communication capacity of the CPU 50.

In the above embodiment, the minor loop operation is performed every horizontal line of the video signal. However, within the allowable range of the shakeproof characteristics, the minor loop operation may be performed every 10 lines. It is important that the sampling frequency of the minor loop is higher than a vertical frequency (59.94 Hz). Preferably, this sampling frequency is generally set to be about 300 Hz.

Shake detection may be delayed as compared with focus detection due to the circuitry arrangements of the detection circuits 44, 46, and 48. In this case, arithmetic operations such as focus control may be preferentially performed. In this case, the shakeproof operation is started with an interrupt immediately after the shake detection result is obtained.

In the above embodiment, in shakeproof control, the signal processing and communication circuit 34 transmits the detection result from the vertical angle detection circuit 28 to the CPU 50 in the camera main body and supplies the shakeproof motor drive signal from the CPU 50 to the motor 20. However, the control function for the minor loop may be incorporated in the signal processing and communication circuit 34. In this case, the minor loop may be arranged by an analog or digital circuit. Even in digital control, the sampling need not be synchronized with the video signal. Therefore, high- and low-speed circuits may be appropriately combined to reduce the cost. In particular, the communication speed between the lens and the camera main body can be reduced.

The operation of the above change is shown in the timing chart of FIG. 4. Pieces of lens information (the detection result from a vertical angle detection circuit 28 and pieces of position information from potentiometers 30 and 32) transferred from the lens to the camera main body, and control signals transferred from the camera main body to the lens are transferred in units of fields.

When the (n−1)th field period is ended, the shake detection circuit 48 outputs a detected shake vector at a timing 86. A CPU 50 immediately fetches this shake vector and performs the shakeproof main loop control operation at a timing 88. Upon completion of the operation, the shakeproof control amount is transmitted by communication to the lens at a timing 82. Upon completion of the shakeproof main loop control operation, focus control and others are performed at a timing 90. The focus control amount and other control amounts are transmitted to the lens at a timing 84 after the shakeproof control amount is transmitted.

As can be apparent from FIG. 4, processing associated with the shakeproof main loop is performed preferentially and synchronized with the field period.

In addition, in FIG. 4, when the CPU 50 receives a vertical angle detection value from the vertical angle detection circuit 28, the CPU 50 discriminates a shake area within the image pickup surface and processes others at a timing 92. Since the loop delay does not adversely affect shakeproof area discrimination, the shakeproof area discrimination is performed after the control operations of the shakeproof main loop.

The above embodiment exemplifies an optical shake correction apparatus using the variable vertical angle prism 10. The present invention is not limited in respect to the arrangement itself of the shake correction apparatus. That is, the present invention is equally applicable to a shakeproof camera using a shake correction apparatus for performing image processing such that a photographed image is temporarily stored in an image memory and image data is read out from a range corresponding to the shake vector.

What is claimed is:

1. A shakeproof camera comprising:
   shake detection means for detecting camera shake;
   a plurality of other detection means for detecting a plurality of information relating to a photographic state; and
   control means for receiving shake detection information from said shake detection means and a plurality of other detection information from said plurality of other detection means and for calculating shake correction information from the shake detection information and other correction information from the plurality of other detection information, wherein, in response to receiving shake detection information from said shake detection means, said control means calculates shake correction information from the shake detection information received from the shake detection means prior to further calculating any other correction information from the plurality of other detection information received from the plurality of other detection means.

2. A camera according to claim 1, further comprising shake correcting means for correcting shake in accordance with the shake correction information calculated by said control means on the basis of an output from said shake detecting means.

3. A camera according to claim 2, wherein said shake correcting means comprises a variable vertical angle prism.

4. A camera according to claim 3, wherein said shake correcting means, said focus correcting means, and said exposure correcting means are arranged in a lens unit, said shake detecting means, said focus detecting means, and said luminance detecting means are arranged in a camera main body, and data is exchanged between said lens unit and said camera main body by communication synchronized with a field period.

5. A camera according to claim 2, wherein said plurality of detecting means further includes focus detecting means for detecting focus state and luminance detecting means for detecting a luminance of an object to be photographed, and said camera further comprising focus correcting means for correcting a focus state on the basis of an output from said focus detecting means, and exposure correcting means for correcting exposure on the basis of an output from said luminance detecting means.

6. A camera according to claim 5, further comprising image pickup means, and wherein said shake detecting means detects shake information of an image from an image pickup signal output from said image pickup means.

7. A camera according to claim 5, wherein said focus detecting means detects a signal component changing in correspondence with a focus state from the image pickup signal output from said image pickup means and detects the focus state.

8. A camera according to claim 5, wherein said luminance detecting means detects a luminance level of the image pickup signal output from said image pickup means.

9. A camera according to claim 1, further comprising image pickup means, and wherein said plurality of detecting means output the detection results during a vertical blanking period of an image pickup signal output from said image pickup means.

10. A camera according to claim 9, wherein said control means starts calculating correction information during the vertical blanking period upon receiving the detection results from said plurality of detecting means.

11. A shakeproof camera comprising:
(A) shake detecting means for detecting a camera shake;
(B) shake correcting means for correcting the camera shake; and
(C) control means for controlling said shake correcting means to correct the shake on the basis of the detection result from said shake detecting means,
wherein said control means controls a first feedback loop for holding said shake correcting means at a predetermined reference position and second feedback loop for driving said shake correcting means in accordance with a detecting result of said shake detecting means with a sampling frequency of the first feedback loop, higher than that of the second feedback loop.

12. A camera according to claim 11, wherein said shake correcting means is a variable vertical angle prism.

13. A camera according to claim 12, wherein the first feedback loop is a feedback control loop for keeping a vertical angle of said variable vertical angle prism constant, and the second feedback loop is a feedback control loop for changing the vertical angle of said variable vertical angle prism on the basis of the detection result from said shake detecting means.

14. A camera according to claim 12, wherein said shakeproof camera comprises a lens unit and a camera main body, the first feedback loop is formed in said lens unit, and the second feedback loop is formed through information communication between said lens unit and said camera main body.

15. A camera according to claim 11, wherein the sampling frequency of the first feedback loop is synchronized with a horizontal synchronization frequency and the sampling frequency of the second feedback loop is synchronized with a vertical synchronization frequency.

16. A camera according to claim 14, wherein the sampling frequency of the first feedback loop is 300 Hz, and the sampling frequency of the second feedback loop is 60 Hz.

17. A camera according to claim 11, further comprising image pickup means, and wherein said shake detecting means detects a shake vector of an image from an image pickup signal output from said image pickup means.

18. A video camera comprising:
image pickup means for outputting an image pickup signal;
shake detection means for detecting a shake vector from the image pickup signal output from said image pickup means;
shake correction means for correcting shake on the basis of the shake vector detected by said shake detection means;
focus detection means for detecting a focus state from the image pickup signal output from said image pickup means;
focus correction means for correcting the focus state on the basis of the focus state detected by said focus detection means; and
control means for receiving the shake vector detected by said shake detection means and the focus state detected by said focus detection means every predetermined period, said control means controlling response characteristics of a shake correcting operation of said shake correction means in accordance with the shake vector detected by said shake detection means, and controlling a focus correcting operation of said focus correction means in accordance with the focus state detected by said focus detection means, wherein, in response to receiving the shake vector detected by said shake detection means, said control means starts a shake correcting operation of said shake correction means according to the shake vector received from the shake detection means prior to performing any further focus correcting operation of said focus correction means.

19. A camera according to claim 18, wherein the detection result from each of said detecting means is received during a vertical blanking feedback operation.

20. A camera according to claim 18, wherein said shake correcting means comprises a variable vertical angle prism.

21. A camera according to claim 18, wherein said control means controls a first feedback loop for holding said shake correcting means at a predetermined reference position and a second feedback loop for driving said shake correcting means in accordance with a detecting result of said shake detecting means with a sampling frequency of the first feedback loop, higher than that of the second feedback loop.

22. A camera according to claim 21, wherein the sampling frequency of the first feedback loop is synchronized with a horizontal synchronization frequency and the sampling frequency of the second feedback loop is synchronized with a vertical synchronization frequency.

23. A camera according to claim 18, further comprising luminance level detecting means for detecting a luminance level of the image pickup signal output from said image pickup means and exposure control means for performing exposure control on the basis of a detection result from said luminance level detecting means.

24. A camera comprising:
a camera main body;
shake detection means for detecting shake of said camera main body to output shake information corresponding to an amount of the detected shake;
shake correction means for correcting shake according to the shake information output from said shake detection means; and
control means including first control means for driving said shake correction means to a predetermined reference position irrespectively of the shake information output from said shake detection means and second control means for controlling said shake correction means according to the shake information output from said shake detection means to reduce the amount of the shake,
wherein said first control means has a control period different from that of said second control means.

25. A camera according to claim 24, wherein the control period of said first control means is shorter than that of said second control means.

26. A camera according to claim 25, wherein said first control means and said second control means include a first feedback loop and a second feedback loop, respectively, and each control period relates to a sampling frequency of the respective feedback loop.

27. A camera according to claim 26, wherein the sampling frequency of said first feedback loop is higher than that of said second feedback loop.

28. A camera according to claim 24, wherein said shake correction means is a variable angle prism.

* * * * *

UNITED STATES PATENT AND TRADEMARK OFFICE
CERTIFICATE OF CORRECTION

PATENT NO. : 6,112,027

DATED : August 29, 2000

INVENTOR(S) : MASAYOSHI SEKINE, ET AL.

It is certified that error appears in the above-identified patent and that said Letters Patent is hereby corrected as shown below:

Column 1

Line 11, "causes" should read --cause--.

Signed and Sealed this

Twenty-ninth Day of May, 2001

Attest:

NICHOLAS P. GODICI

Attesting Officer  Acting Director of the United States Patent and Trademark Office